United States Patent
Cullerot et al.

(10) Patent No.: US 11,924,899 B2
(45) Date of Patent: *Mar. 5, 2024

(54) MULTIPATH TCP WITH MESH ACCESS

(71) Applicant: Parallel Wireless, Inc., Nashua, NH (US)

(72) Inventors: David Cullerot, Amherst, NH (US); Yang Cao, Westford, MA (US); Jitender Arora, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,068

(22) Filed: Nov. 30, 2021

(65) Prior Publication Data
US 2022/0086940 A1   Mar. 17, 2022

Related U.S. Application Data

(63) Continuation of application No. 16/520,242, filed on Jul. 23, 2019, now Pat. No. 11,191,121.

(60) Provisional application No. 62/702,257, filed on Jul. 23, 2018.

(51) Int. Cl.
*H04W 76/16* (2018.01)
*H04W 80/06* (2009.01)
*H04W 88/10* (2009.01)
*H04W 88/18* (2009.01)

(52) U.S. Cl.
CPC ............ *H04W 76/16* (2018.02); *H04W 80/06* (2013.01); *H04W 88/10* (2013.01); *H04W 88/182* (2013.01)

(58) Field of Classification Search
None
See application file for complete search history.

(56) References Cited

U.S. PATENT DOCUMENTS

| | | | |
|---|---|---|---|
| 2012/0188949 A1* | 7/2012 | Salkintzis | H04W 40/02 370/329 |
| 2015/0296415 A1* | 10/2015 | Ling | H04W 76/12 455/552.1 |
| 2016/0037428 A1* | 2/2016 | Kanugovi | H04L 69/14 370/329 |
| 2016/0366049 A1* | 12/2016 | Achouri | H04L 69/16 |
| 2017/0223148 A1* | 8/2017 | Roeland | H04W 36/0027 |
| 2018/0041921 A1* | 2/2018 | Kojima | H04L 45/245 |
| 2019/0335520 A1* | 10/2019 | Dion | H04L 69/14 |
| 2020/0383158 A1* | 12/2020 | Misra | H04L 65/403 |
| 2021/0185493 A1* | 6/2021 | Legg | H04W 76/12 |
| 2021/0297341 A1* | 9/2021 | Achouri | H04W 4/44 |

\* cited by examiner

Primary Examiner — Gregory B Sefcheck
(74) Attorney, Agent, or Firm — Michael Y. Saji

(57) ABSTRACT

Systems, methods and computer software are disclosed for providing Multipath Transmission Control Protocol (MPTCP) with mesh access. A multi Radio Access Technology (RAT) base station gateway having a MPTCP proxy, proxies an initial MPTCP connection from a User Equipment (UE). The multi-RAT base station gateway determines if the UE is capable of MPTCP to provide MPTCP. When the UE is capable of MPTCP, then the multi-Rat base station provides a Wi-Fi connection and an LTE connection. When the UE is not capable of MPTCP, then the multi-RAT base station provides an LTE connection.

23 Claims, 12 Drawing Sheets

MULTIPATH TCP WITH MESH ACCESS

CROSS-REFERENCE TO RELATED APPLICATIONS

This application is a continuation of U.S. application Ser. No. 16/520,242, filed Jul. 23, 2019, issued as U.S. Pat. No. 11,191,121 on Nov. 30, 2021, which claims priority under 35 U.S.C. § 119(e) to U.S. Provisional App. No. 62/702,257, filed Jul. 23, 2018, titled "Multipath TCP with Mesh Access," each of which is hereby incorporated by reference in its entirety for all purposes. This application also hereby incorporates by reference U.S. patent application Ser. No. 15/241,060, entitled "Cell ID Disambiguation" and filed Aug. 18, 2016, which itself is a non-provisional conversion of, and claims the benefit of priority under 35 U.S.C. § 119(e) to, U.S. Provisional Pat. App. No. 62/206,666, filed Aug. 18, 2015 with title "Cell ID Disambiguation," each hereby incorporated by reference in its entirety. As well, U.S. Pat. No. 8,867,418 and U.S. Pat. App. No. 20140133456 are also hereby incorporated by reference in their entireties. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. Pat App. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. patent application Ser. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, having respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and U.S. patent application Ser. No. 15/713,584 (PWS-71850US03).

BACKGROUND

Multipath Transmission Control Protocol (MPTCP) enables inverse multiplexing of resources, and thus increases TCP throughput to the sum of all available link-level channels instead of using a single one as required by plain TCP. Multipath TCP is backward compatible with plain TCP. Multipath TCP is particularly useful in the context of wireless networks; using both Wi-Fi and a mobile network. In addition to the gains in throughput from inverse multiplexing, links may be added or dropped as the user moves in or out of coverage without disrupting the end-to-end TCP connection.

The problem of link handover is thus solved by abstraction in the transport layer, without any special mechanisms at the network or link level. Handover functionality can then be implemented at the endpoints without requiring special functionality in the subnetworks - in accordance to the Internet's end-to-end principle. Multipath TCP also brings performance benefits in datacenter environments. Multipath TCP can balance a single TCP connection across multiple interfaces and reach very high throughput. MPTCP is defined in IETF RFC 6824, which is hereby incorporated by reference in its entirety.

Smartphones (UEs) have a motivation for using MPTCP as this would allow them to efficiently exploit their 4G/3G and Wi-Fi interfaces in parallel and provide seamless mobility. However, MPTCP must be supported on both the smartphones and the application server.

SUMMARY

Systems, methods and computer readable mediums for multipath TCP with mesh access are described. In one example embodiment, a method for providing Multipath Transmission Control Protocol (MPTCP) with mesh access includes proxying, by a multi-Radio Access Technology (M-RAT) base station gateway having an MPTCP proxy, an MPTCP connection with a User Equipment (UE). The method also includes determining, by the M-RAT base station gateway, if the UE is capable of MPTCP to provide MPTCP. The method further includes when the UE is capable of MPTCP, then providing, by the M-RAT base station gateway, a Wi-Fi connection and an LTE connection; and when the UE is not capable of MPTCP, then providing, by the M-RAT base station gateway, an LTE connection.

In another example embodiment, a system for providing Multipath Transmission Control Protocol (MPTCP) with mesh access is described. The system includes a multi-Radio Access technology (M-RAT) base station gateway, and a User Equipment (UE) in wireless communication with the M-RAT base station gateway. The M-RAT base station gateway has a MPTCP proxy, and proxies an initial MPTCP connection with the User Equipment (UE). The M-RAT base station gateway determines if the UE is capable of MPTCP to provide MPTCP and when the UE is capable of MPTCP, then the M-RAT base station gateway provides a Wi-Fi connection and an LTE connection. When the UE is not capable of MPTCP, then the M-RAT base station gateway provides an LTE connection.

In another example embodiment, a non-transitory computer-readable medium is provided containing instructions for providing Multipath Transmission Control Protocol (MPTCP) wherein the instructions, when executed, cause a multi-Radio Access Technology (M-RAT) base station gateway to perform steps including proxying, by a MPTCP proxy of the M-RAT base station gateway, an initial MPTCP connection with a User Equipment (UE) and determining if the UE is capable of MPTCP to provide MPTCP. When the UE is capable of MPTCP, then providing a Wi-Fi connection and an LTE connection; and when the UE is not capable of MPTCP, then providing an LTE connection.

DETAILED DESCRIPTION

Figure 1:
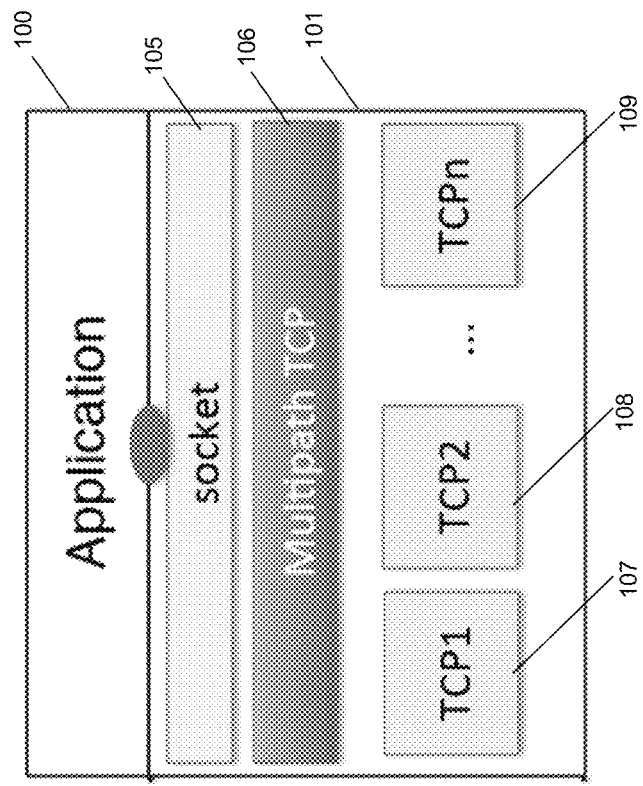
FIG. 1 is a diagram showing different layers and applications used in providing MPTCP, in accordance with some embodiments.
Figure 1:
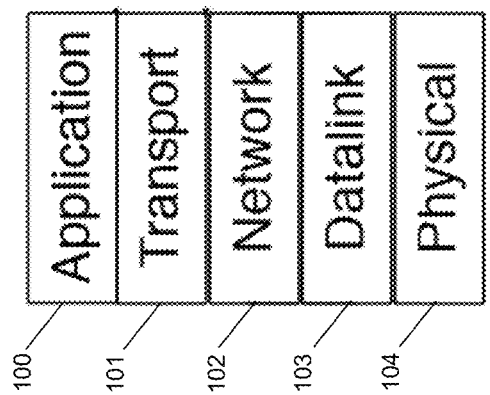

The inventors have contemplated the use of a multipath TCP proxy (MPTCP proxy) located between the UE and the core network to provide enhanced capacity and in some cases coverage. A MPTCP proxy is a gateway that proxies TCP and multipath TCP connections passing through it, and that transparently acts as a back-to-back user agent (B2BUA) for converting ordinary TCP flows into MPTCP flows and vice versa. MPTCP involves the use of multiple subflows, which are determined at the time of TCP handshake and which can be updated later. The MPTCP proxy therefore proxies any TCP connection at the handshake stage to determine what subflows are available, and subsequently manages the subflows that are available. The MPTCP proxy is situated between the two endpoints of the TCP connection, which are the UE and the application server/destination of the UE's data flow; there are several appropriate locations for a MPTCP proxy in the network as described herein. Noteworthy is that the MPTCP proxy can be situated in the cellular core network upstream from the RAN, meaning that it is possible to make the MPTCP proxy agnostic of (1) UE radio access technology (RAT); and (2) RAN backhaul.

The MPTPC proxy can add or delete subflows as appropriate. For example, the MPTCP proxy can determine whether to add or delete subflows based on: (1) receiving a notification from the UE that it has (re-)connected to a particular access network; (2) receiving a notification from a cellular or Wi-Fi or Internet core network that the UE has (re-)connected to a particular access network; (3) receiving a notification from a core network that a link is available or less or more congested; (4) based on a congestion control algorithm; (5) based on information regarding UE capabilities, such as RAT capabilities; (6) based on information regarding global network conditions and topology; (7) based on information regarding the destination of a given connection; (8) any combination of the above. For example, in the use case of providing wireless access at a sporting event stadium, with a MPTCP proxy located at the stadium, the MPTCP proxy may provide special rules to enable UEs to watch instant replay video streams via subflows that use Wi-Fi and local cellular subflows (subflows that do not transit the cellular core network), as the MPTCP proxy is aware that such data is locally cached at the stadium and are able to be downloaded to the UE without transiting the core network. This takes into account information about the topology of the network, about the location of the cached data, and about the RAT capabilities of the UEs.

The core networks as described herein may be cellular, Wi-Fi, Internet, Internet Multimedia Subsystem (IMS), 2G, 3G, 4G/5G EPC, 5G SA/NSA, multiple core networks, multi-operator core networks (MOCN), or any other core network, as appropriate. In some embodiments, the Babel protocol (see IETF RFC 6126, hereby incorporated by reference) could be used to provide simplifications to MPTCP client and MPTCP proxy configuration and in particular dynamic configuration of routes at a MPTCP proxy acting as a MPTCP client.

In some embodiments, an increase in both capacity and coverage is enabled. Capacity is increased because a MPTCP proxy located between the RAN and the Internet enables the use of Wi-Fi offload to deliver traffic. The MPTCP proxy is therefore able to increase effective capacity from the capacity of the cellular core network to the sum of the Wi-Fi backhaul and cellular core network by using Wi-Fi offload. Coverage can also be increased using MPTCP and mesh backhaul. Mesh as referenced herein can refer to the use of (1) three or more base stations connected wirelessly using a standard Wi-Fi connection, using a Babel protocol to self-configure routes among themselves; or (2) any wireless backhaul capability. Wirelessly backhauled Wi-Fi access points can quickly provide increased coverage for UEs with Wi-Fi capability with a minimum of configuration; the use of a MPTCP proxy enables UEs connected to these APs to leverage the Wi-Fi APs for Wi-Fi calling via secure wireless gateways such as TWAGs or ePDGs, as well as using the Wi-Fi APs for as much or as little throughput as needed to bypass or augment the capacity of the cellular data network.

Based on UE's content request, in some embodiments a Traffic Manager (TM) automatically triggers either full-mode or single-path-mode of MPTCP. Local caching is based on the most recent content popularity. ACK pacing is automatically adjusted based on the network congestion status.

In some embodiments, the MPTCP proxy determines whether the UE is capable of MPTCP at TCP handshake time. In other embodiments, the determination is based on: UE stored data at the core network; equipment information of the UE that is transmitted or stored or requested, including stored IMSI; heuristics for determining generally what class of device the UE is (for example, what version of Apple iOS is supported).

Where the word UE is used herein it is understood to encompass, where appropriate, a base station connected via a mesh link that could be the beneficiary of MPTCP, for example to increase backhaul capacity.

MPTCP proxying is independent of logical interface construct, independent of IP address changes, and permits multiple TCP connections to co-exist. UDP handover is handled via S2a. All MPTCP flows are proxied via HNG and UE applications needs to support MPTCP.

Cellular operators can leverage the MPTCP to offload the traffic to Wi-Fi infrastructure and to provide higher throughput. This will allow them to save Capex/Opex for cellular networks.

Wi-Fi operators can provide better coverage: hotel—where Wi-Fi coverage can be choppy; in this case they can leverage the cellular network and use the MPTCP to create flows using both the Wi-Fi and LTE/3G, enterprise—in case Wi-Fi signal strength is weak, they can use the Wi-Fi and LTE/3G for data intensive applications. Better user quality of experience is provided as well as seamless handover from one interface to another in case of connectivity problems, and higher throughput.

Subscribers with MPTCP UEs can take advantage of both and load balance for high bandwidth applications. Example applications include on-demand video, broadcast video and video sharing.

The present disclosure makes various references to a HNG (HetNet Gateway). With respect to the Parallel Wireless HNG, details pertaining to the HNG are found in the publications incorporated herein by reference. For example, the HNG is a virtualizing server that provides configuration and multi-RAT interworking and proxying to a plurality of base stations that it manages. However, the inventors do not intend any loss of generality thereby, and generally understand that the functionality described herein, including MPTCP functionality, can be provided at any suitably-situated gateway.

Similarly, the present disclosure makes references to a CWS (Converged Wireless System, which details are found in the publications incorporated herein by reference. For example, the CWS is a multi-RAT base station (providing combinations of 2G/3G/4G/5G/Wi-Fi/TVWS, etc.) that also provides Wi-Fi and LTE wireless backhaul capability, and in some cases is able to operate as a non-fixed base station (the base station itself is mobile). However, the inventors do not intend any loss of generality thereby, and generally understand that the functionality described herein, including MPTCP functionality, can be provided at any suitably-situated base station and/or access point.

FIG. 1 shows different layers of the OSI model generally identifying the operation of MPTCP. Shown are the application layer 10 (layer 7), the transport layer 101 (layer 4), the network layer 102 (layer 3), the data link layer 103 (layer 2) the physical layer 104 (layer 1). The application layer 100 has a socket to the transport layer 101. The transport layer includes the socket 105, which sits on top of a multipath TCP layer 106. The MPTCP layer integrates multiple TCP subflows 107, 108, . . . 109 and determines when to add/delete subflows, and determines which subflows to use when a request to send data is received from application 100 via socket 105. When data comes in via any of the subflows 107, 108, . . . 109, the MPTCP layer 106 reorders and integrates the received data and provides it in order to socket 105.

Figure 2:
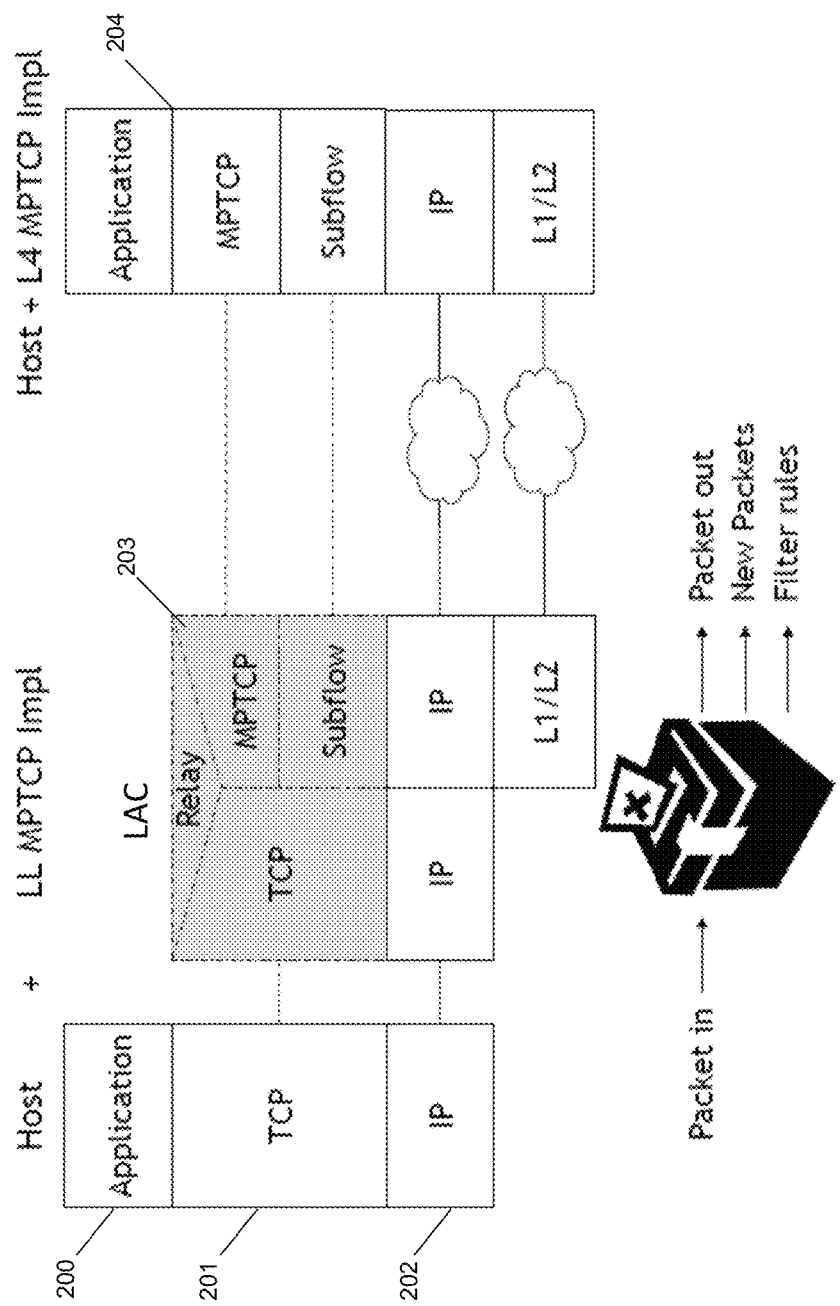
FIG. 2 is diagram showing a MPTCP proxy construct in accordance with some embodiments.

An example MPTCP proxy construct is shown in FIG. 2, in accordance with some embodiments. A host device (app server, which may not support MPTCP) includes an application layer 200, a TCP layer 201 and an IP layer 202. An MPTCP proxy 203 (identified as LAC or Parallel Wireless LTE Access Controller, which is an HNG) receives the TCP packets, transparently proxies the TCP connection, and uses the TCP, relay MPTCP, and subflow components to perform MPTCP proxying. The resulting MPTCP flows and subflows are passed to a UE 204 which supports MPTCP.

Additional scenarios are contemplated. The use of two MPTCP proxies can enable the use of MPTCP for both UEs and hosts that do and do not support MPTCP. For example, in the case of a UE that does not support MPTCP and a host server that does not support MPTCP, two MPTCP proxies can be used, one near the access base station and one near the Internet/core network egress. The access MPTCP proxy can transparently turn the originating TCP flow into several MPTCP subflows and use a variety of routes to connect to the core network MPTCP proxy (thereby increasing capacity), and the core network MPTCP proxy can transparently turn the MPTCP subflows into a single egress TCP flow. Different MPTCP proxies may be positioned based on network topology and bandwidth considerations.

Figure 3:
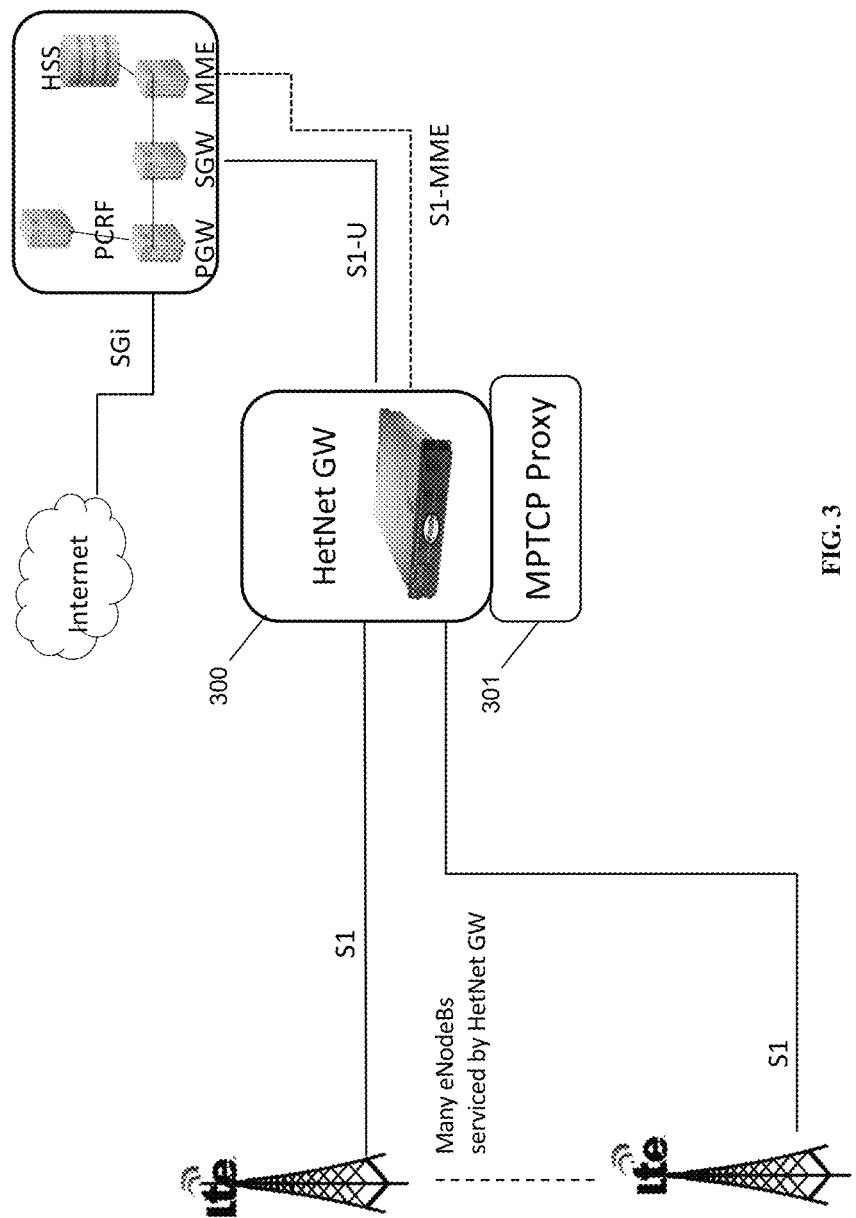
FIG. 3 is a diagram showing a MPTCP proxy as part of an HNG, in accordance with some embodiments.

FIG. 3 shows a an MPTCP proxy 301 as part of the HNG 300, in accordance with some embodiments. The MPTCP Proxy 301 performs as a proxy relay in case the app server does not support MPTCP. The MPTCP proxy also provides transparent forwarding if the app-server supports MPTCP. Also provided is native TCP optimization (ACK acceleration) to improve throughput. (Wherever a MPTCP proxy is identified herein, TCP optimization is contemplated.)

Figure 4:
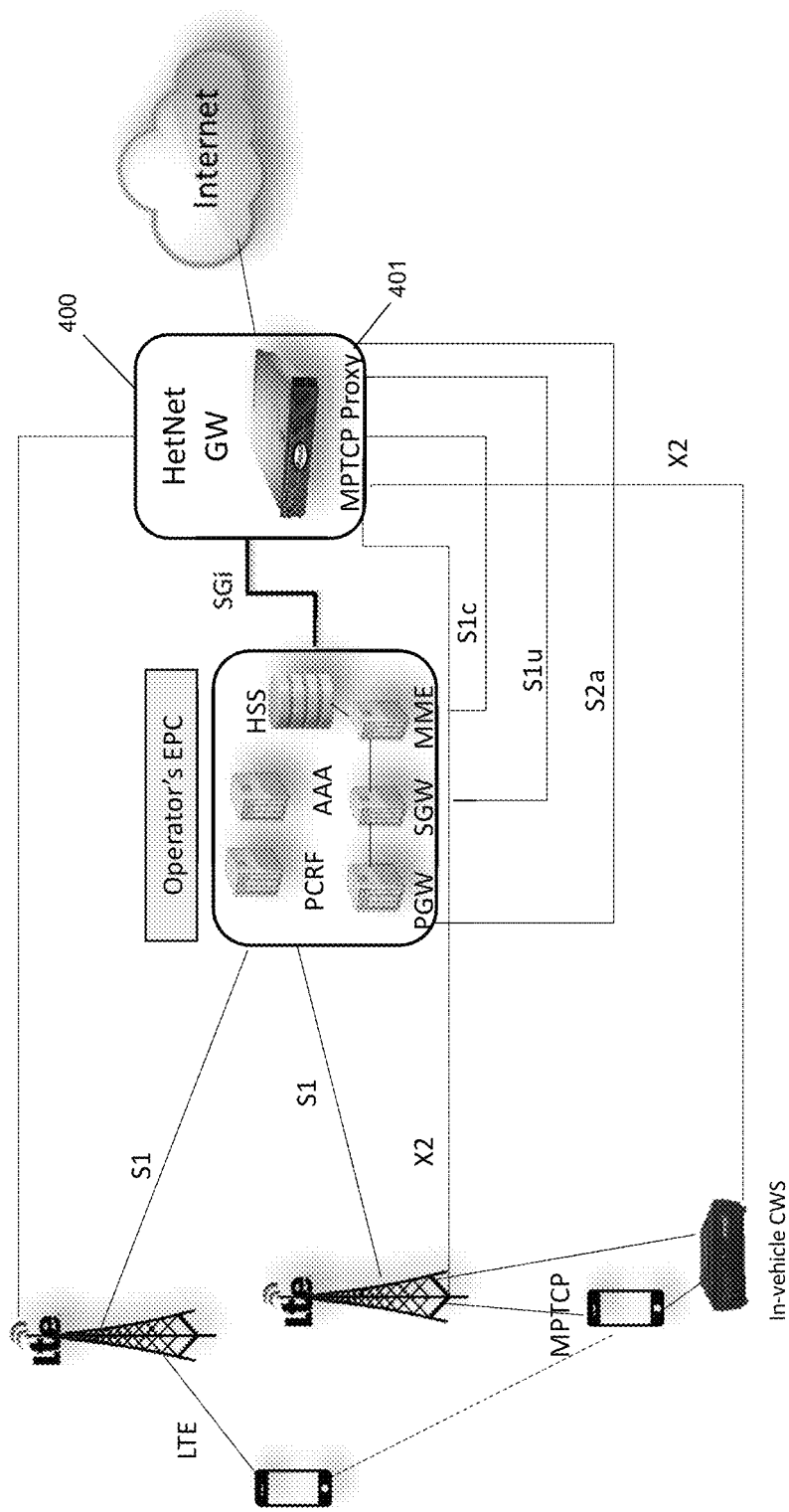
FIG. 4 is diagram showing a MPTCP proxy in a mobility application, in accordance with some embodiments.

FIG. 4 shows a wireless system featuring an HNG 400 including an MPTCP proxy 401, in some embodiments. In such a system simultaneous LTE and Wi-Fi access are provided to a UE supporting MPTCP via an in-vehicle base station (in-vehicle CWS). In operation, the UE is initially covered by a standard macro LTE base station. The initial MPTCP connection is proxied by the HNG at the point of egress from the operator's EPC core network to the Internet. When the UE gets on the bus, the following takes place: if the Wi-Fi capacity is sufficient, the CWS will provide both Wi-Fi and LTE connection (to increase the throughput). User Datagram Protocol (UDP) traffic is carried via the Wi-Fi connection and re-anchored to PGW by HNG via the S2a interface, therefore the IP address is kept the same after attach to the CWS. If Wi-Fi capacity is limited, CWS will provide LTE connection only. The LTE local serving traffic (within the bus) will be relayed by the CWS to a macro base station via LTE backhaul, as shown. The MPTCP connection established in all scenarios will be proxied by the HNG. When the UE leaves the bus, the MPTCP connection is handed out via macro LTE and also proxied by the HNG. In all cases, the Wi-Fi to LTE handover is transparent to the UE, since the TCP connection is maintained at the HNG and the host device or app server is able to continuously send data to the HNG via regular TCP, while the HNG uses MPTCP via two segments (Wi-Fi via the CWS, and LTE via the macro base station) to send data to and from the UE.

Figure 5:
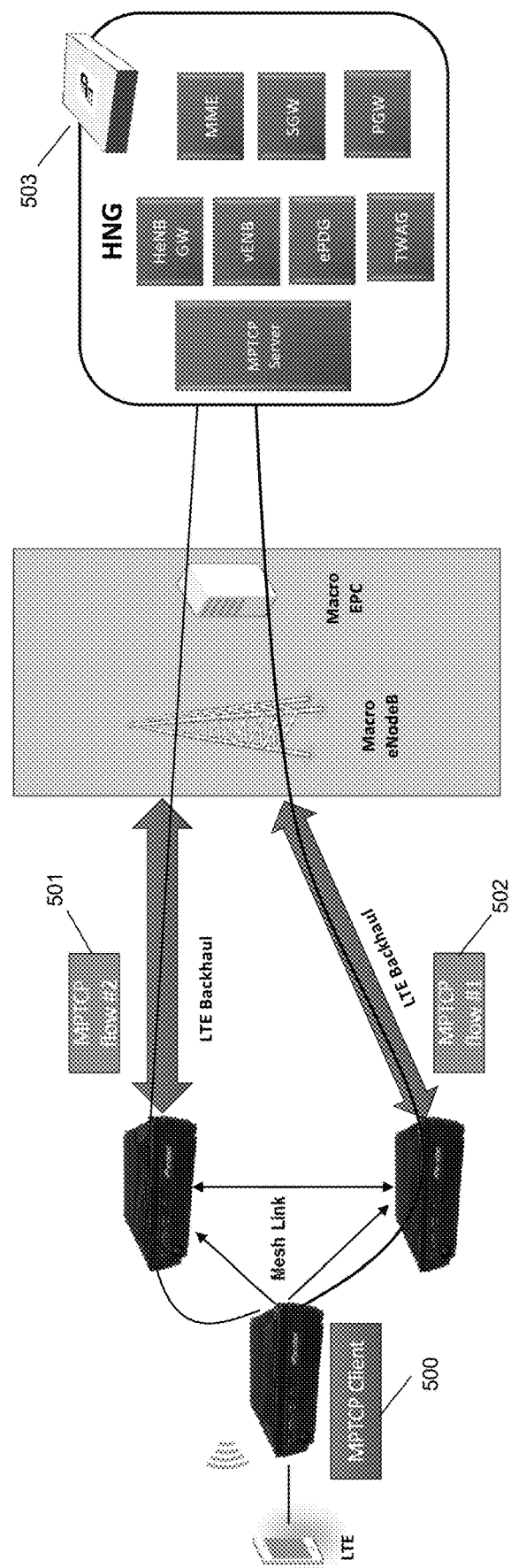
FIG. 5 is a diagram showing a first MPTCP use case for mesh backhaul, in accordance with some embodiments.

FIG. 5 shows an MPTCP use case for mesh backhaul, in accordance with some embodiments. In this example, the MPTCP client 500 is located at the base station closest to the UE (i.e., the edge base station), and permits the use of multiple backhaul links for all of its traffic via Wi-Fi mesh and subflows 501 and 502. Subflow 501 exits via one LTE backhaul connection to a macro eNodeB. Subflow 502 exits via another LTE backhaul connection to the same macro eNodeB. Since two LTE backhaul connections are used, 2× the LTE air interface throughput is enabled to be provided as backhaul for the edge base station with MPTCP client 500.

Continuing through the network, the subflows transit through the core network (macro EPC) until they reach the HNG 503, which sits between the core network and the Internet (not shown). The MPTCP proxy server at HNG 503 proxies the MPTCP flow from the MPTCP client 500 back to a single TCP flow.

In some embodiments, the edge base station uses an IPsec tunnel for backhauling, terminating at HNG 503. In some embodiments, the MPTCP flow shown can be used to carry an IPsec tunnel providing backhaul for all UEs connected to the edge base station. In some embodiments, multiple MPTCP flows can be carried via (are encapsulated in) multiple IPsec tunnels and rejoined at HNG 503.

Figure 6:
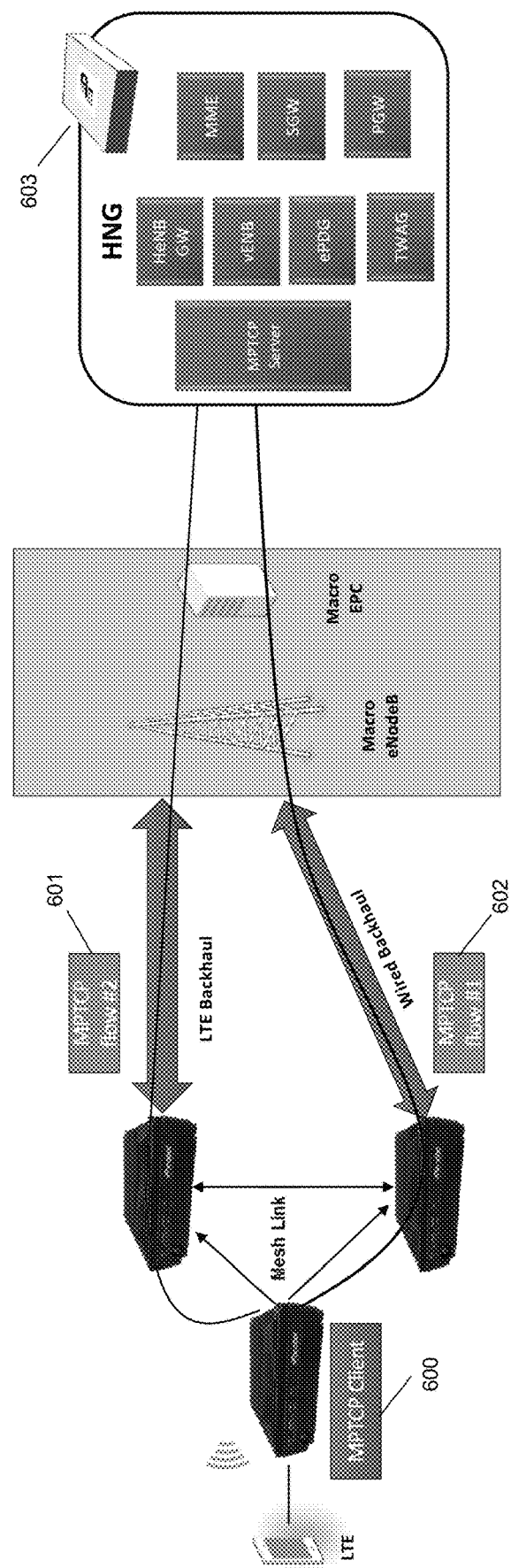
FIG. 6 is a diagram showing a second MPTCP use case for mesh backhaul, in accordance with some embodiments.

FIG. 6 shows another MPTCP use case for mesh backhaul, in accordance with some embodiments. In this example, the edge base station has a MPTCP client 600 and is connected via Wi-Fi mesh to two additional base stations. One of the mesh base stations has LTE backhaul and supports MPTCP flow #2 601. The other mesh base station has wired backhaul and supports MPTCP flow #1 602. The MPTCP flows 601 and 602 transit through the EPC and are rejoined at MPTCP proxy server at HNG 603. In this scenario, the base station with wired backhaul can perform backhauling of both of the other base stations using the capacity of its wired connection, and dynamic routing using Babel can be used for both MPTCP and for regular TCP within the mesh.

Figure 7:
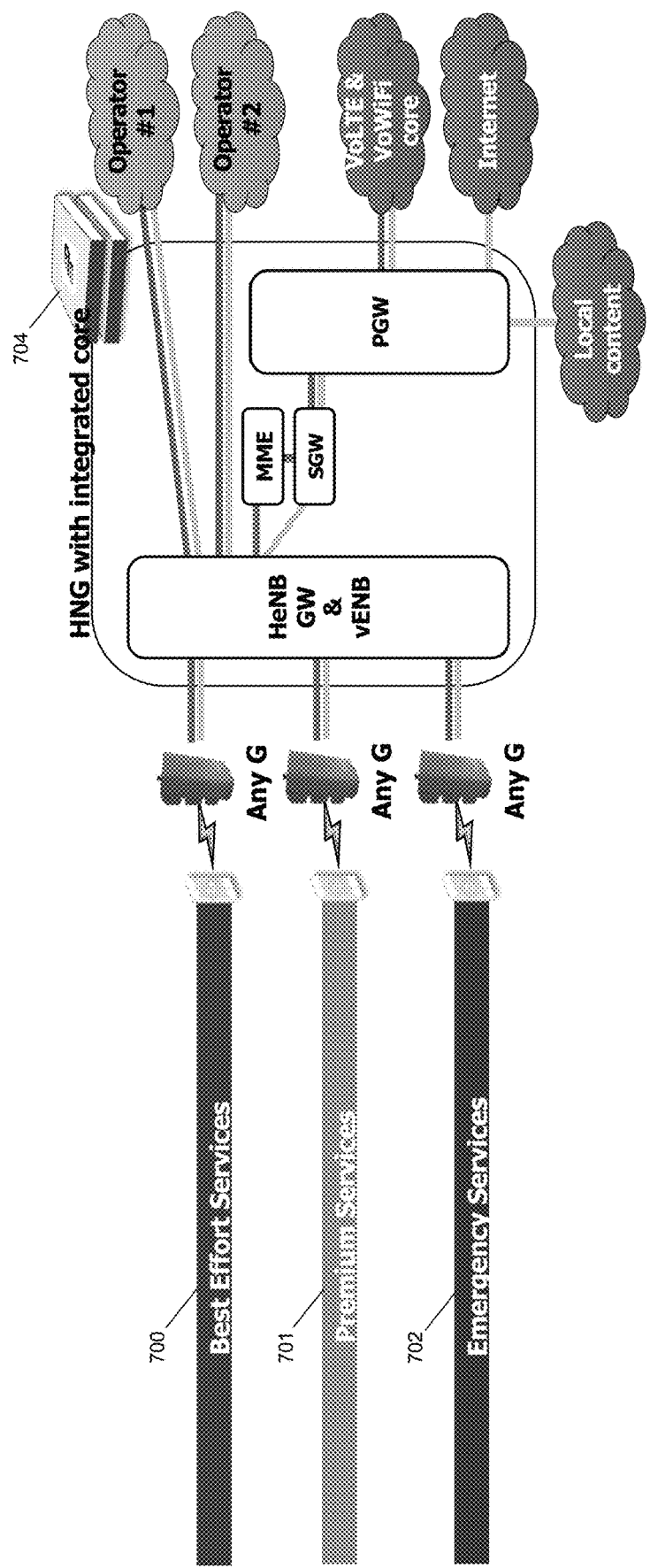
FIG. 7 is a diagram showing RAN slicing to provide dedicated coverage to different types of subscribers, in accordance with some embodiments.

FIG. 7 shows an example of providing prioritized coverage to different types of subscribers, in accordance with some embodiments. "Any G" is shown; in reality each of a selection of RATs would be provided, based on operator needs. However, the architecture shown is able to be used with 2G/3G/4G/5G/Wi-Fi/other RATs. Three types of services are shown in this example, best effort services 700, premium services 701, and emergency services 702, provided over Any G. An HNG with integrated core 704 is provided, with the any-G base stations being managed using a home eNodeB gateway and virtual eNodeB virtualizing gateway, which provides necessary information to MME and SGW within the integrated core. The HeNB GW/vENB also provides connections to operator #1 and operator #2 core networks, thereby enabling neutral host and RAN sharing capabilities for the Any G base stations. For more information about the interworking of multiple RATs to this architecture, the reader is directed to review the references incorporated by reference herein.

A PGW is also provided, with the PGW having egress links to the Internet, as well as to local content and to VoLTE/VoWiFi voice core networks. Local content is a frequently cited application/use case that can be enabled using this architecture; specifically, video content that is cached near the HNG can be provided at high speed without the need to transit the Internet or an operator core network. Examples of appropriate locations for this architecture include, e.g., hotels; resorts; sports venues; performance venues; airplanes, buses, ships, or other mobile passenger vehicles; enterprises; office towers; municipalities; etc. Shared licensed and unlicensed spectrum could be used for Any G access. Wireless backhaul, including licensed and unlicensed spectrum, could be used.

Prioritization or network slices can be enabled as described by, e.g., 5G or DSCP or QoS, to offer differentiated service for specific user profiles. Example applications include augmented reality, broadcast video and video sharing. Undifferentiated Internet data can be provided via the PGW Internet and local content egresses and high-priority or voice data can be provided using the operator core networks.

Figure 8:
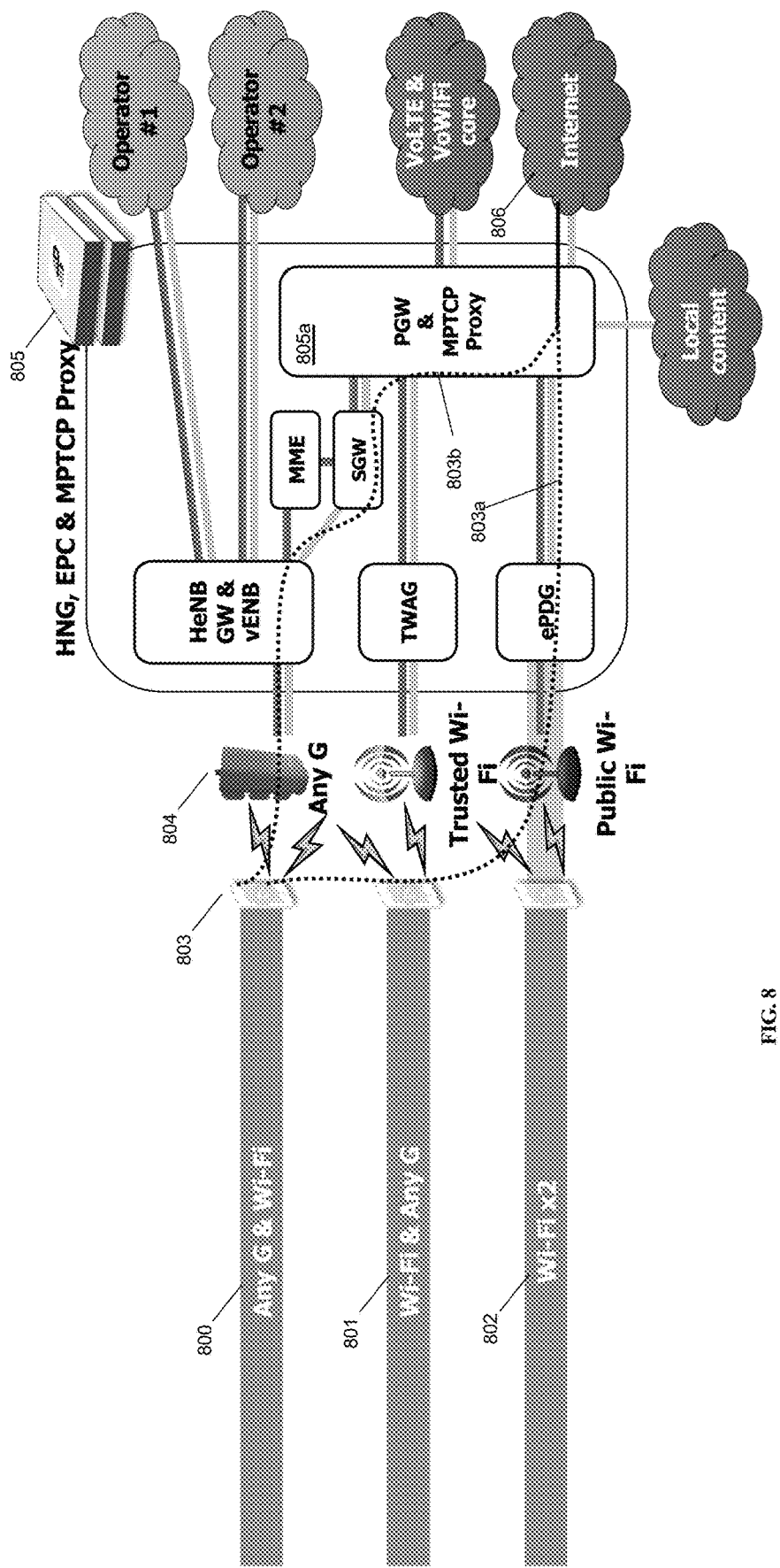
FIG. 8 is a diagram showing an example of MPTCP in use over an Any G architecture, in accordance with some embodiments.

FIG. 8 shows an example of MPTCP in use over an Any G architecture, in accordance with some embodiments. Flows 800, 801, 802 show a variety of UEs that are connected via a variety of RATs to base stations 804; here, UE 803 is connected via Any G (e.g., a particular RAT such as 4G) and Wi-Fi, with other UEs being connected via other RATs such as two forms of Wi-Fi. Any combination of RATs is understood to be contemplated by the inventors. Base stations 804 include an Any G base station and a Public Wi-Fi access point. The Any G base station (here, assume 4G) is connected via an HeNB GW/vENB that is part of Parallel Wireless HNG 805 integrated core network. HNG 805 is redundantly configured. The Public Wi-Fi AP is connected via an ePDG that is part of HNG 805 integrated core network. UE 803 is MPTCP-capable.

In operation, the UE 803 makes a request to open a connection with a host server (not shown) via the Internet 806. However, assume the host server does not support MPTCP. During TCP handshaking, PGW/MPTCP proxy 805a reports that MPTCP is available, causing UE 803 to establish two subflows, 803a and 803b. Subflow 803a is transmitted over Wi-Fi via the Wi-Fi AP and ePDG. Subflow 803b is transmitted via the cellular RAT. Both subflows 803a and 803b are joined at PGW/MPTCP proxy 805a, which transparently turns the MPTCP flow into a non-multipath TCP flow before sending it out over the Internet 806 to the host server. This results in a significant increase in throughput to UE 803, and also results in some offload of the SGW and other core network nodes.

If the host server supports MPTCP, MPTCP proxy 805a will operate similarly but will transparently forward all MPTCP traffic to the MPTCP-capable host server. In the case of local content, the MPTCP flows will not be bandwidth-constrained when sending data to and from the host server, so the any G base stations and Wi-Fi APs will be able to route subflows to take advantage of all radio channels that are available based on local RF conditions.

In some embodiments, any combination of RATs can be used for MPTCP. For example: 5G NR and Wi-Fi can be combined to provide high throughput for bandwidth-hungry users. MPTCP may combine 4G and 5G; 4G with 3G; 4G with Wi-Fi; 2G with 3G; 2G and 4G; or any other combination thereof. MPTCP may take into account multiple topologies, for example, treating IP paths that bypass the cellular core network as separate paths even if they are enabled by the same or different RATs (for example, Wi-Fi providing a connection to both the local network and the core network). MPTCP may be combined with quality of service and/or network slicing, and the MPTCP proxy may be aware of the different network capabilities/speeds/performance guarantees available to different flows, and may perform routing to subflows that are appropriate for the application (for example, low-latency applications may be directed to low-latency subflows). Mesh base stations, moving base stations, self-organizing base stations, and base stations with intermittently available backhaul links may be supported. In some embodiments, the quality of links can be assessed in real time (mesh links, RAT links as well as subflows), and subflow routing can be adjusted by the MPTCP proxy in real time.

In some embodiments, given the nature of the capacity requirement for applications like a stadium is on-demand, a fleet of drones can be dispatched with CWS onboard to enable such on-demand capacity. This flying- cell-fleet approach would leverage 3 strengths on our side: ad-hoc (in-sync w/our mesh approach), mesh and MPTCP. As long as the battery on the drone can sustain up to 5+ hours, it would be sufficient to cover most or all users in the stadium for the duration of most sporting events. For more details regarding ad-hoc configuration capability as applied to base stations and mobile base stations, the reader is invited to review the documents incorporated by reference above.

Multi-backhaul as well as multiple paths would be supported (fiber, satellite, 3G, 4G, 5G) and would operate to complement local breakout for IP traffic, for example, this would support different routing for video feeds that are actually supplied within the stadium (e.g., instant replays). MPTCP proxy could detect whether core network nodes, PCRF, etc. support MPTCP and adjust proxying accordingly for all flows to any of these nodes.

The multipath TCP proxy described herein could operate similar to that described in US20120331160, hereby incorporated by reference in its entirety for all purposes.

In one embodiment a method for providing Multipath Transmission Control Protocol (MPTCP) with mesh access includes proxying, by a multi-Radio Access Technology (RAT) base station having a MPTCP proxy, an initial MPTCP connection from a User Equipment (UE) and determining, by the multi-RAT base station, if the UE is capable of MPTCP to provide MPTCP. The method also includes when the UE is capable of MPTCP, then providing, by the multi-RAT base station, a Wi-Fi connection and an LTE connection; and when the UE is not capable of MPTCP, then providing, by the multi-RAT base station, an LTE connection. The method may also include, when the UE is capable of MPTCP, carrying UDP traffic via the Wi-Fi connection and re-anchored to the packet data network gateway (PGW) by the multi-RAT base station via an S2a interface. The method may further include, when the UE is not capable of MPTCP, relaying the LTE local serving traffic to a macro. The base station may be one or more of a mobile base station, a self-organizing base station and a mesh base station.

In another embodiment, a method for providing Multipath Transmission Control Protocol (MPTCP) with mesh access, includes proxying, by a multi-Radio Access Technology (RAT) base station having a MPTCP proxy, an initial MPTCP connection from a User Equipment (UE) and determining, by the multi-RAT base station, if there is sufficient 5G capacity to provide MPTCP. The method may also include, when there is sufficient 5G capacity, then providing, by the multi-RAT base station, a 5G connection and a 4G connection; and when there is insufficient 5G capacity, then providing, by the multi-RAT base station, a 4G connection. The method may further include, when there is sufficient 5G-Fi capacity, carrying UDP traffic via the 5G connection and re-anchored to the packet data network gateway (PGW) by the multi-RAT base station via an S2a interface. The method may also include, when there is insufficient 5G capacity, relaying the 4G local serving traffic to a macro. The base station may be one or more of a mobile base station, a self-organizing base station and a mesh base station.

In another embodiment, a method for providing Multipath Transmission Control Protocol (MPTCP) with mesh access, includes proxying, by a multi-Radio Access Technology (RAT) base station having a MPTCP proxy, an initial MPTCP connection from a User Equipment (UE) and determining, by the multi-RAT base station, if there is sufficient cellular capacity to provide MPTCP; and when there is sufficient cellular capacity, then providing, by the multi-RAT base station, a cellular connection and a Wi-Fi connection; and when there is insufficient cellular capacity, then providing, by the multi-RAT base station, a Wi-Fi connection. The method may further include, when there is sufficient cellular capacity, carrying UDP traffic via the cellular connection and re-anchored to the packet data network gateway (PGW) by the multi-RAT base station via an S2a interface. The method may also include, when there is insufficient cellular capacity, relaying the Wi-Fi local serving traffic to a macro. The base station may be one or more of a mobile base station, a self-organizing base station and a mesh base station.

In another example embodiment, a method for providing Multipath Transmission Control Protocol (MPTCP) with mesh access includes proxying, by a multi-Radio Access Technology (RAT) base station having a MPTCP proxy, an initial MPTCP connection from a User Equipment (UE) and determining, by the multi-RAT base station, if there is sufficient capacity for a first RAT to provide MPTCP. The method further includes, when there is sufficient capacity using the first RAT, then providing, by the multi-RAT base station, a connection using the first RAT and a connection using a second RAT different from the first RAT, wherein the first RAT provides Quality of Service (QoS) and wherein the second RAT does not provide QoS; and when there is insufficient capacity, then providing, by the multi-RAT base station, a second RAT connection. The base station may be one or more of a mobile base station, a self-organizing base station and a mesh base station.

In another example embodiment, a method for providing Multipath Transmission Control Protocol (MPTCP) with mesh access includes proxying, by a multi-Radio Access Technology (RAT) base station having a MPTCP proxy, an initial MPTCP connection from a User Equipment (UE), and determining, by the multi-RAT base station, if there is sufficient capacity for a first RAT to provide MPTCP. When there is sufficient capacity using the first RAT, then providing, by the multi-RAT base station, a connection using the first RAT and a connection using a second RAT different from the first RAT, wherein the first RAT provides network slicing; and when there is insufficient capacity, then providing, by the multi-RAT base station, a second RAT connection. The base station may be one or more of a mobile base station, a self-organizing base station and a mesh base station.

Figure 9:
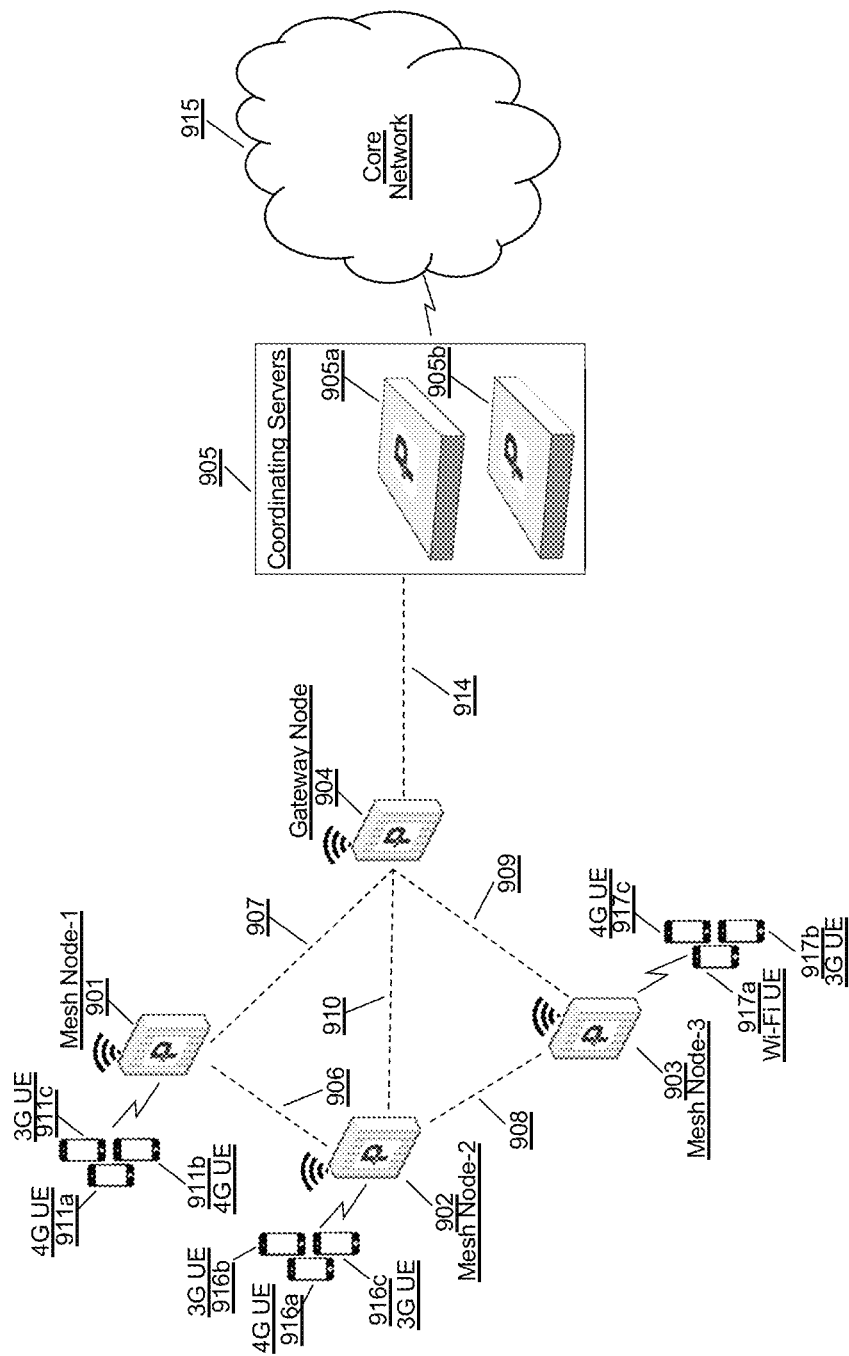
FIG. 9 is a network diagram in accordance with some embodiments.

FIG. 9 is a network diagram in accordance with some embodiments. In some embodiments, as shown in FIG. 9, a mesh node 1 901, a mesh node 2 902, and a mesh node 3 903 are any G RAN nodes. Base stations 901, 902, and 903 form a mesh network establishing mesh network links 906, 907, 908, 909, and 910 with a base station 904. The mesh network links are flexible and are used by the mesh nodes to route traffic around congestion within the mesh network as needed. The base station 904 acts as gateway node or mesh gateway node, and provides backhaul connectivity to a core network to the base stations 901, 902, and 903 over backhaul link 914 to a coordinating server(s) 905 and towards core network 915. The Base stations 901, 902, 903, 904 may also provide eNodeB, NodeB, Wi-Fi Access Point, Femto Base Station etc. functionality, and may support radio access technologies such as 2G, 3G, 4G, 5G, Wi-Fi etc. The base stations 901, 902, 903 may also be known as mesh network nodes 901, 902, 903.

The coordinating servers 905 are shown as two coordinating servers 905a and 905b. The coordinating servers 905a and 905b may be in load-sharing mode or may be in active-standby mode for high availability. The coordinating servers 905 may be located between a radio access network (RAN) and the core network and may appear as core network to the base stations in a radio access network (RAN) and a single eNodeB to the core network, i.e., may provide virtualization of the base stations towards the core network. As shown in FIG. 9, various user equipments 911a, 911b, 911c are connected to the base station 901. The base station 901 provides backhaul connectivity to the user equipments 911a, 911b, and 911c connected to it over mesh network links 906, 907, 908, 909, 910 and 914. The user equipments may be mobile devices, mobile phones, personal digital assistant (PDA), tablet, laptop etc. The base station 902 provides backhaul connection to user equipments 912a, 912b, 912c and the base station 903 provides backhaul connection to user equipments 913a, 913b, and 913c. The user equipments 911a, 911b, 911c, 912a, 912b, 912c, 913a, 913b, 913c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 911a, 911b, 911c, 912a, 912b, 912c, 913a, 913b, and 913c, the uplink 914 may get congested under certain circumstances. As described above, to continue the radio access network running and providing services to the user equipments, the solution requires prioritizing or classifying the traffic based at the base stations 901, 902, 903. The traffic from the base stations 901, 902, and 903 to the core network 915 through the coordinating server 905 flows through an IPSec tunnel terminated at the coordinating server 905. The mesh network nodes 901, 902, and 903 adds IP Option header field to the outermost IP Header (i.e., not to the pre-encapsulated packets). The traffic may from the base station 901 may follow any of the mesh network link path such as 907, 906-110, 906-108-109 to reach to the mesh gateway node 904, according to a mesh network routing protocol.

Figure 10:
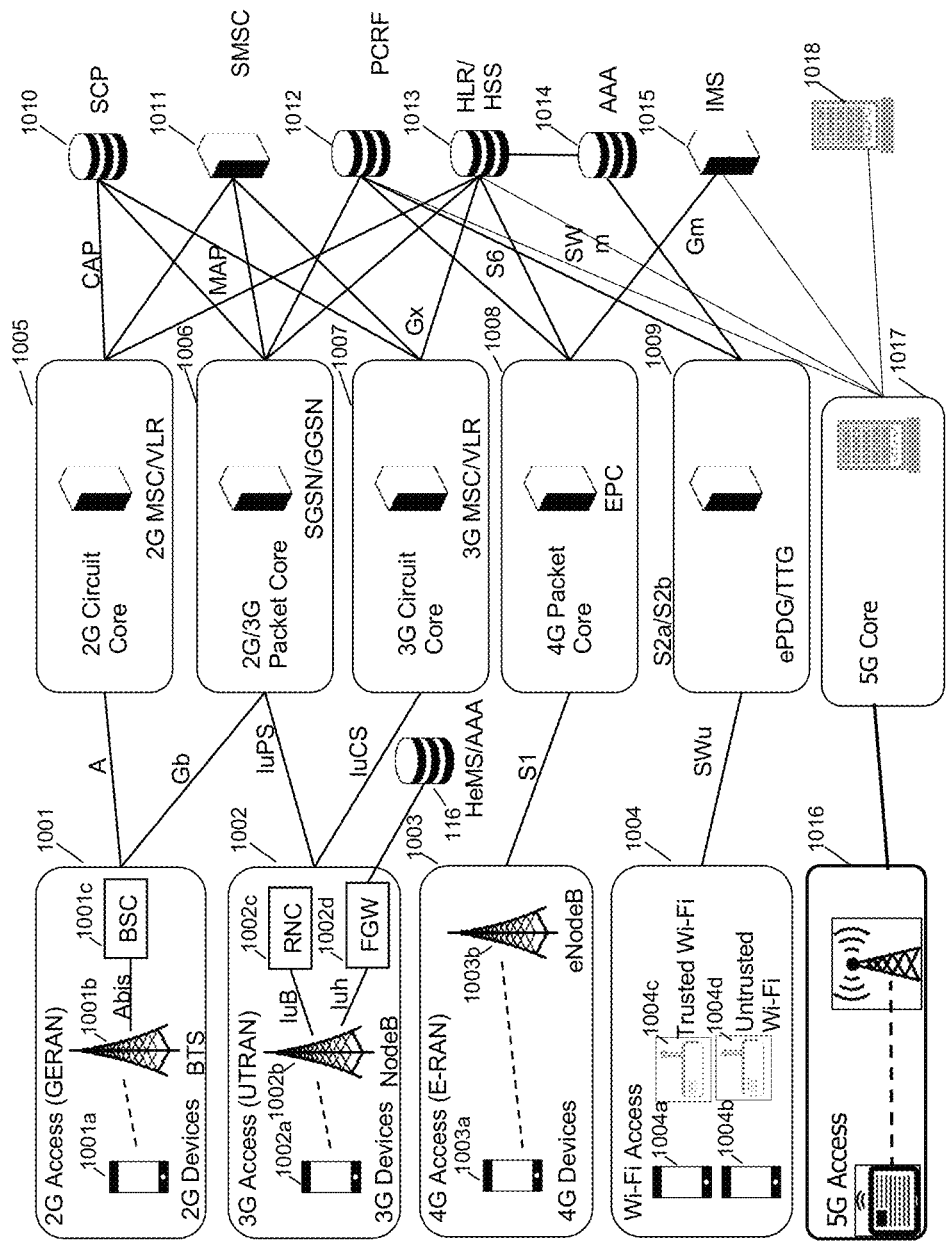
FIG. 10 is a network architecture diagram for 5G and other G networks.

FIG. 10 is a network architecture diagram for 5G and other-G networks. The diagram shows a plurality of "Gs," including 2G, 3G, 4G, 5G and Wi-Fi. 2G is represented by GERAN 1001, which includes a 2G device 1001a, BTS 1001b, and BSC 1001c. 3G is represented by UTRAN 1002, which includes a 3G UE 1002a, nodeB 1002b, RNC 1002c, and femto gateway (FGW, which in 3GPP namespace is also known as a Home nodeB Gateway or HNBGW) 1002d. 4G is represented by EUTRAN or E-RAN 1003, which includes an LTE UE 1003a and LTE eNodeB 1003b. Wi-Fi is represented by Wi-Fi access network 1004, which includes a trusted Wi-Fi access point 1004c and an untrusted Wi-Fi access point 1004d. The Wi-Fi devices 1004a and 1004b may access either AP 1004c or 1004d. In the current network architecture, each "G" has a core network. 2G circuit core network 1005 includes a 2G MSC/VLR; 2G/3G packet core network 1006 includes an SGSN/GGSN (for EDGE or UMTS packet traffic); 3G circuit core 1007 includes a 3G MSC/VLR; 4G circuit core 1008 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 1030, the SMSC 1031, PCRF 1032, HLR/HSS 1033, Authentication, Authorization, and Accounting server (AAA) 1034, and IP Multimedia Subsystem (IMS) 1035. An HeMS/AAA 1036 is present in some cases for use by the 3G UTRAN. The diagram is used to indicate schematically the basic functions of each network as known to one of skill in the art, and is not intended to be exhaustive. For example, 5G core 1017 is shown using a single interface to 5G access 1016, although in some cases 5G access can be supported using dual connectivity or via a non-standalone deployment architecture.

Noteworthy is that the RANs 1001, 1002, 1003, 1004 and 1036 rely on specialized core networks 1005, 1006, 1007, 1008, 1009, 1037 but share essential management databases 1030, 1031, 1032, 1033, 1034, 1035, 1038. More specifically, for the 2G GERAN, a BSC 1001c is required for Abis compatibility with BTS 1001b, while for the 3G UTRAN, an RNC 1002c is required for Iub compatibility and an FGW 1002d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 11:
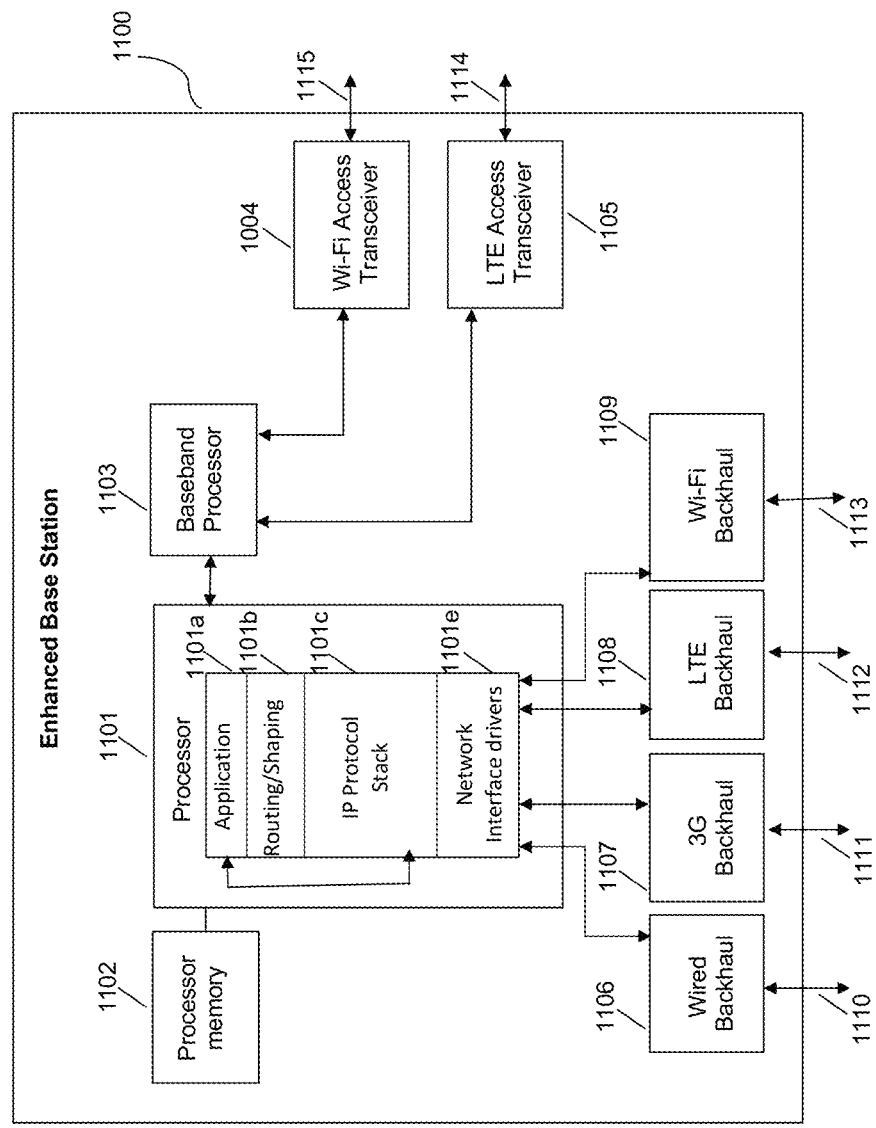
FIG. 11 is an enhanced eNodeB for performing the methods described herein, in accordance with some embodiments.

FIG. 11 is an enhanced eNodeB for performing the methods described herein, in accordance with some embodiments. Mesh network node 1100 may include processor 1102, processor memory 1104 in communication with the processor, baseband processor 1106, and baseband processor memory 1108 in communication with the baseband processor. Mesh network node 1100 may also include first radio transceiver 1112 and second radio transceiver 1114, internal universal serial bus (USB) port 1116, and subscriber information module card (SIM card) 1118 coupled to USB port 1116. In some embodiments, the second radio transceiver 1114 itself may be coupled to USB port 1116, and communications from the baseband processor may be passed through USB port 1116. The second radio transceiver may be used for wirelessly backhauling eNodeB 1100.

Processor 1102 and baseband processor 1106 are in communication with one another. Processor 1102 may perform routing functions, and may determine if/when a switch in network configuration is needed. Baseband processor 1106 may generate and receive radio signals for both radio transceivers 1112 and 1114, based on instructions from processor 1102. In some embodiments, processors 1102 and 1106 may be on the same physical logic board. In other embodiments, they may be on separate logic boards.

Processor 1102 may identify the appropriate network configuration, and may perform routing of packets from one network interface to another accordingly. Processor 1102 may use memory 1104, in particular to store a routing table to be used for routing packets. Baseband processor 1106 may perform operations to generate the radio frequency signals for transmission or retransmission by both transceivers 1110 and 1112. Baseband processor 1106 may also perform operations to decode signals received by transceivers 1112 and 1114. Baseband processor 1106 may use memory 1108 to perform these tasks.

The first radio transceiver 1112 may be a radio transceiver capable of providing LTE eNodeB functionality, and may be capable of higher power and multi-channel OFDMA. The second radio transceiver 1114 may be a radio transceiver capable of providing LTE UE functionality. Both transceivers 1112 and 1114 may be capable of receiving and transmitting on one or more LTE bands. In some embodiments, either or both of transceivers 1112 and 1114 may be capable of providing both LTE eNodeB and LTE UE functionality. Transceiver 1112 may be coupled to processor 1102 via a Peripheral Component Interconnect-Express (PCI-E) bus, and/or via a daughtercard. As transceiver 1114 is for providing LTE UE functionality, in effect emulating a user equipment, it may be connected via the same or different PCI-E bus, or by a USB bus, and may also be coupled to SIM card 1118. First transceiver 1112 may be coupled to first radio frequency (RF) chain (filter, amplifier, antenna) 1122, and second transceiver 1114 may be coupled to second RF chain (filter, amplifier, antenna) 1124.

SIM card 1118 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1100 is not an ordinary UE but instead is a special UE for providing backhaul to device 1100.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1112 and 1114, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1102 for reconfiguration.

A GPS module 1130 may also be included, and may be in communication with a GPS antenna 1132 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1132 may also be present and may run on processor 1102 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 12:
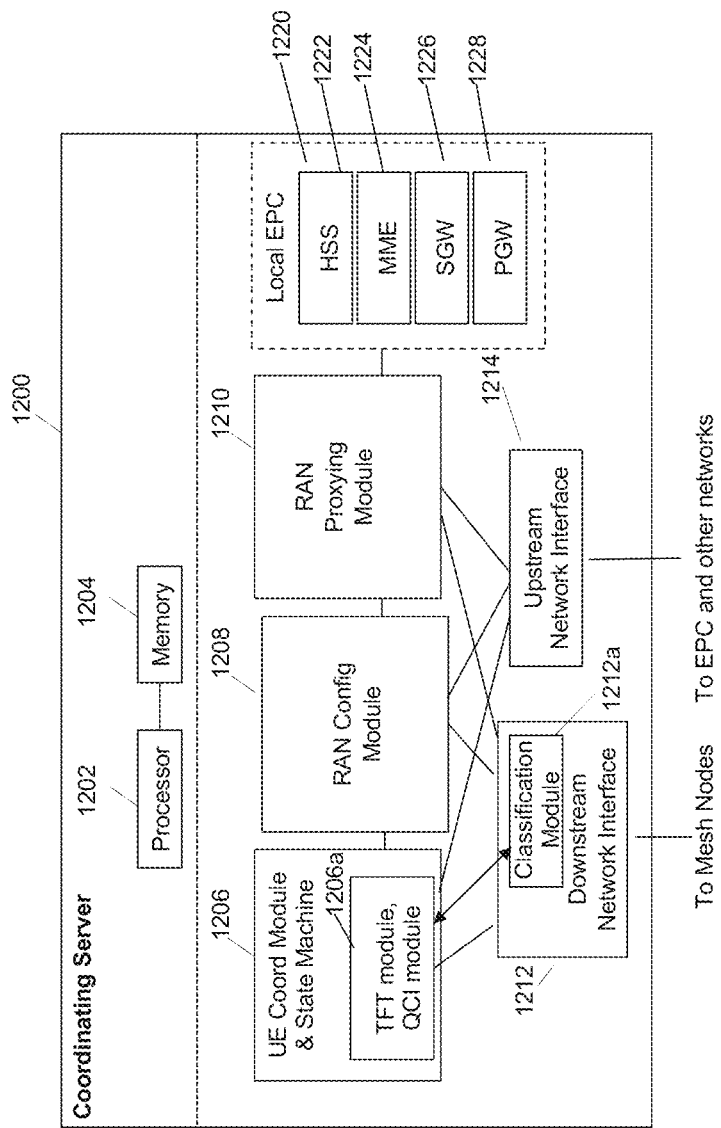
FIG. 12 is a coordinating server for providing services and performing methods as described herein, in accordance with some embodiments.

FIG. 12 is a coordinating server for providing services and performing methods as described herein, in accordance with some embodiments. Coordinating server 1200 includes processor 1202 and memory 1204, which are configured to provide the functions described herein. Also present are radio access network coordination/routing (RAN Coordination and routing) module 1206, including ANR module 1206a, RAN configuration module 1208, and RAN proxying module 1210. The ANR module 1206a may perform the ANR tracking, PCI disambiguation, ECGI requesting, and GPS coalescing and tracking as described herein, in coordination with RAN coordination module 1206 (e.g., for requesting ECGIs, etc.). In some embodiments, coordinating server 1200 may coordinate multiple RANs using coordination module 1206. In some embodiments, coordination server may also provide proxying, routing virtualization and RAN virtualization, via modules 1210 and 1208. In some embodiments, a downstream network interface 1212 is provided for interfacing with the RANs, which may be a radio interface (e.g., LTE), and an upstream network interface 1214 is provided for interfacing with the core network, which may be either a radio interface (e.g., LTE) or a wired interface (e.g., Ethernet).

Coordinator 1200 includes local evolved packet core (EPC) module 1220, for authenticating users, storing and caching priority profile information, and performing other EPC-dependent functions when no backhaul link is available. Local EPC 1220 may include local HSS 1222, local MME 1224, local SGW 1226, and local PGW 1228, as well as other modules. Local EPC 1220 may incorporate these modules as software modules, processes, or containers. Local EPC 1220 may alternatively incorporate these modules as a small number of monolithic software processes. Modules 1206, 1208, 1210 and local EPC 1220 may each run on processor 1202 or on another processor, or may be located within another device.

In any of the scenarios described herein, where processing may be performed at the cell, the processing may also be performed in coordination with a cloud coordination server.

A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application. Multipath TCP could be used with 4G, 5G, both, together, separately, etc. and could be used with IPv4 as well as IPv6. Mixing IPv4 and IPv6 would be possible, in some embodiments.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E- UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases, Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single- connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 5G networks, LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing Multipath Transmission Control Protocol (MPTCP) using a cellular radio access technology (RAT) base station, comprising:
   proxying, by a base station gateway having a MPTCP proxy, an MPTCP connection with a User Equipment (UE);
   determining by the base station gateway, if the UE is capable of MPTCP to provide MPTCP with the UE;
   when the UE is capable of MPTCP, then providing, by the base station gateway, a Wi-Fi connection and a cellular connection as a MPTCP connection; and
   when the UE is not capable of MPTCP, then providing, by the cellular RAT base station, the cellular connection; and
   when the UE is capable of MPTCP, carrying user datagram protocol (UDP) traffic via the Wi-Fi connection and re-anchored to a packet data network gateway (PGW) by the base station gateway via a second interface, and; when the UE is not capable of MPTCP, relaying cellular local serving traffic to a macro.

2. The method of claim 1 further comprising, when the UE is capable of MPTCP, carrying UDP traffic via the Wi-Fi connection and re-anchored to the packet data network gateway (PGW) by the base station gateway via an S2a interface, and; when the UE is not capable of MPTCP, relaying LTE local serving traffic to a macro.

3. The method of claim 1 wherein the base station gateway is one or more of a mobile base station, a self-organizing base station and a mesh base station.

4. The method of claim 1 further comprising acting, by the MPTCP proxy, as a proxy-relay when the application server does not support MPTCP; and providing, by the MPTCP proxy, transparent forwarding when the application server does support MPTCP.

5. The method of claim 1 wherein the MPTPC proxy is situated between a cellular core network of the base station and the Internet, and between a security gateway of the Wi-Fi Access Point (AP) and the Internet.

6. A method for providing Multipath Transmission Control Protocol (MPTCP) using a cellular radio access technology (RAT) base station, comprising:
   proxying, by the base station gateway having a MPTCP proxy, an initial MPTCP connection with a User Equipment (UE);
   determining, by the base station gateway, if there is sufficient 5G capacity to provide MPTCP;
   when there is sufficient 5G capacity, then providing, by the M -RAT base station, a 5G connection and a 4G connection;
   when there is insufficient 5G capacity, then providing, by the multi-RAT base station, a 4G connection; and
   when the UE is capable of MPTCP, carrying user datagram protocol (UDP) traffic via the 5G connection and re-anchored to a 4G packet data network gateway (PGW) by the base station gateway via a second interface, and; when the UE is not capable of MPTCP, relaying cellular local serving traffic to a macro.

7. The method of claim 6 further comprising, when there is sufficient 5G capacity, carrying UDP traffic via the 5G connection and re-anchored to the packet data network gateway (PGW) by the base station gateway via an S2a interface, and; when there is insufficient 5G capacity, relaying the 4G local serving traffic to a macro.

8. The method of claim 6 wherein the base station gateway is one or more of a mobile base station, a self-organizing base station and a mesh base station.

9. The method of claim 6 further comprising acting, by the MPTCP proxy, as a proxy-relay when the application server does not support MPTCP; and providing, by the MPTCP proxy, transparent forwarding when the application server does support MPTCP.

10. The method of claim 6 wherein the MPTPC proxy is situated between a cellular core network of the base station and the Internet.

11. A method for providing Multipath Transmission Control Protocol (MPTCP) using a cellular radio access technology (RAT) base station, comprising:
    proxying, by the base station gateway having a MPTCP proxy, an initial MPTCP connection with a User Equipment (UE);
    determining, by the RAT base station, if there is sufficient cellular capacity to provide MPTCP with the UE;
    when there is sufficient cellular capacity, then providing, by the base station gateway, a cellular connection and a Wi-Fi connection;
    when there is insufficient cellular capacity, then providing, by the RAT base station, a Wi-Fi connection; and
    when the UE is capable of MPTCP, carrying user datagram protocol (UDP) traffic via the Wi-Fi connection and re-anchored to a packet data network gateway (PGW) by the base station gateway via a second interface, and; when the UE is not capable of MPTCP, relaying cellular local serving traffic to a macro.

12. The method of claim 11 further comprising, when there is sufficient cellular capacity, carrying UDP traffic via the cellular connection and re-anchored to the packet data network gateway (PGW) by the base station gateway via an S2a interface, and; when there is insufficient cellular capacity, relaying the Wi-Fi local serving traffic to a macro.

13. The method of claim 11 wherein the base station is one or more of a mobile base station, a self-organizing base station and a mesh base station.

14. The method of claim 11 further comprising acting, by the MPTCP proxy, as a proxy-relay when the application server does not support MPTCP; and providing, by the MPTCP proxy, transparent forwarding when the application server does support MPTCP.

15. The method of claim 11 wherein the MPTPC proxy is situated between a cellular core network of the base station and the Internet, and between a security gateway of the Wi-Fi Access Point (AP) and the Internet.

16. A method for providing Multipath Transmission Control Protocol (MPTCP) using a multi-radio access technology (RAT) base station, comprising:
   proxying, by the base station gateway having a MPTCP proxy, an MPTCP connection with a User Equipment (UE);
   determining, by the base station gateway, if there is sufficient capacity for a first RAT to provide MPTCP;
   when there is sufficient capacity using the first RAT, then providing, by the base station gateway, a connection using the first RAT and a connection using a second RAT different from the first RAT, wherein the first RAT provides Quality of Service (QoS) and wherein the second RAT does not provide QoS;
   when there is insufficient capacity, then providing, by the RAT base station, a second RAT connection; and
   when the UE is capable of MPTCP, carrying user datagram protocol (UDP) traffic via the Wi-Fi connection and re-anchored to a packet data network gateway (PGW) by the base station gateway via a second interface, and; when the UE is not capable of MPTCP, relaying cellular local serving traffic to a macro.

17. The method of claim 16 wherein the base station is one or more of a mobile base station, a self-organizing base station and a mesh base station.

18. The method of claim 16 further comprising acting, by the MPTCP proxy, as a proxy-relay when the application server does not support MPTCP; and providing, by the MPTCP proxy, transparent forwarding when the application server does support MPTCP.

19. The method of claim 16 wherein the MPTPC proxy is situated between a cellular core network of the base station and the Internet, and between a security gateway of the Wi-Fi Access Point (AP) and the Internet.

20. A method for providing Multipath Transmission Control Protocol (MPTCP) using a multi-radio access technology (RAT) base station, comprising:
   proxying, by the base station gateway having a MPTCP proxy, an MPTCP connection with a User Equipment (UE);
   determining, by the base station gateway, if there is sufficient capacity for a first RAT to provide MPTCP;
   when there is sufficient capacity using the first RAT, then providing, by the base station gateway, a connection using the first RAT and a connection using a second RAT different from the first RAT, wherein the first RAT provides network slicing;
   when there is insufficient capacity, then providing, by the base station gateway, a second RAT connection; and
   when the UE is capable of MPTCP, carrying user datagram protocol (UDP) traffic via the first RAT connection and re-anchored to a packet data network gateway (PGW) by the base station gateway via a second interface, and; when the UE is not capable of MPTCP, relaying cellular local serving traffic from the first RAT to a macro of the second RAT.

21. The method of claim 20 wherein the base station is one or more of a mobile base station, a self-organizing base station and a mesh base station.

22. The method of claim 20 further comprising acting, by the MPTCP proxy, as a proxy-relay when the application server does not support MPTCP; and providing, by the MPTCP proxy, transparent forwarding when the application server does support MPTCP.

23. The method of claim 20 wherein the MPTPC proxy is situated between a cellular core network of the base station and the Internet, and between a security gateway of the Wi-Fi Access Point (AP) and the Internet.

* * * * *